UNITED STATES PATENT OFFICE.

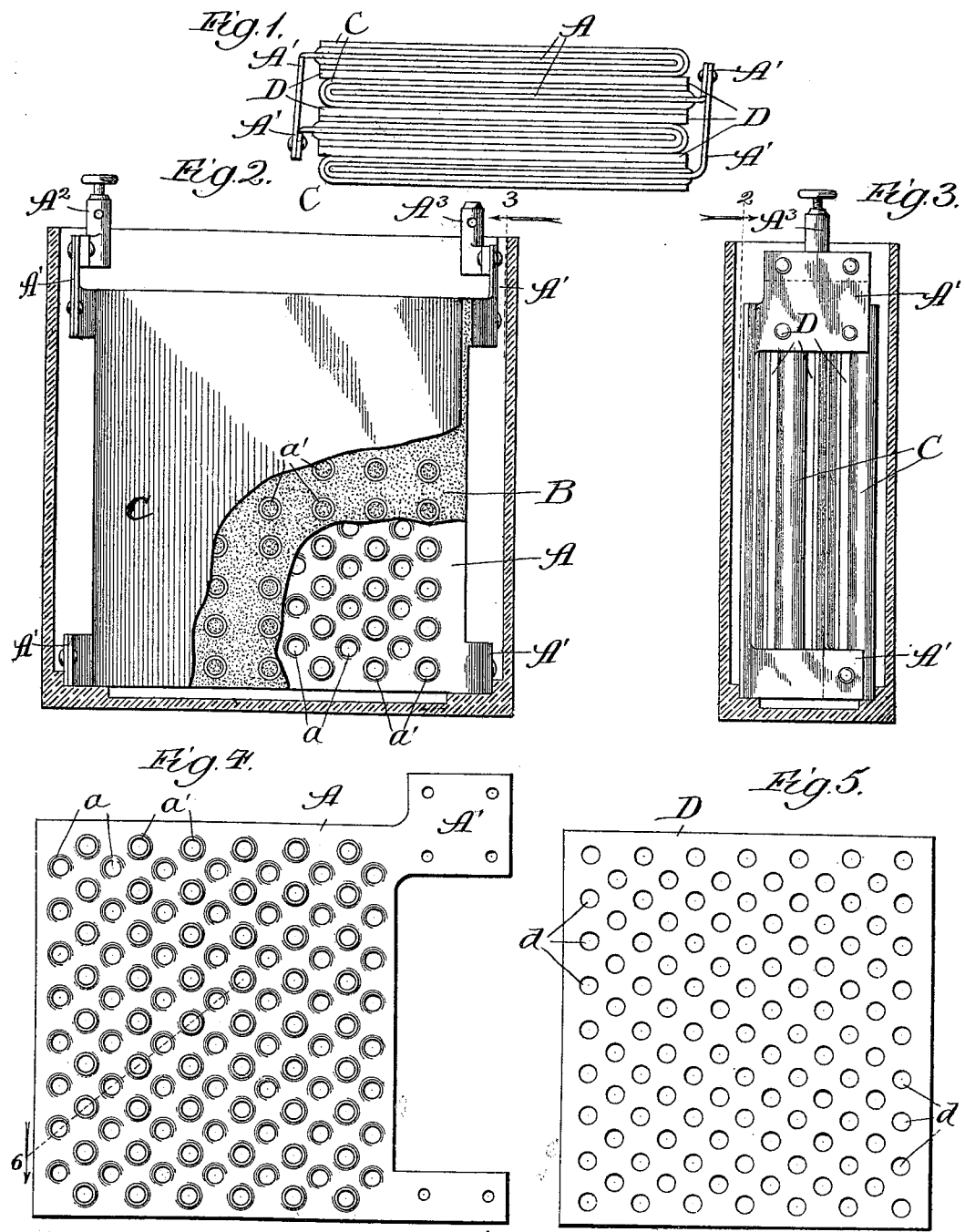

WALTER A. CROWDUS, OF CHICAGO, ILLINOIS, ASSIGNOR TO THE CROWDUS COMPANY, OF SAME PLACE.

SECONDARY BATTERY.

SPECIFICATION forming part of Letters Patent No. 622,124, dated March 28, 1899.

Application filed June 8, 1898. Serial No. 682,891. (No model.)

*To all whom it may concern:*

Be it known that I, WALTER A. CROWDUS, a citizen of the United States, residing at Chicago, in the county of Cook and State of Illinois, have invented certain new and useful Improvements in Secondary Batteries, of which the following is a specification.

My invention relates to that type of accumulators or secondary batteries in which the metal lead is used for the positive and negative elements.

The object of my invention is to provide a simple, economical, and light secondary battery.

A further object is to construct a special form of lead supporting-plate for holding the active material, which may be mechanically applied thereto or electrochemically formed from the lead itself.

A further object is to construct a light and flexible plate which presents a very large active surface to the electrolyte, while the main body portion of the plate is centrally located within the active material.

A further object is to arrange an envelop of suitable material for holding the active material in close contact with the supporting lead plate and to provide a specially-perforated and porous separator disposed between the envelop and the next opposing plate, so as to fill this remaining space with a porous and flexible perforated absorbent for the electrolyte.

The invention consists principally in a supporting plate or grid for a secondary battery composed of a relatively thin sheet of metal having a multiplicity of stamped perforations with raised edges.

It consists, further, in a supporting-plate for a secondary battery composed of a relatively thin sheet of metallic lead having a multiplicity of circular perforations alternately stamped from side to side with raised edges.

It consists, further and finally, in the features, combinations, and details of construction hereinafter described and claimed.

In the accompanying drawings, Figure 1 is a plan view of the elements of the battery arranged in accordance with my improvement; Fig. 2, a side elevation of a battery with one of the elements partially broken away, showing the parts arranged in accordance with my improvement; Fig. 3, a vertical sectional elevation taken on line 3 of Fig. 2, looking in the direction of the arrow; Fig. 4, a side elevation of one of the supporting-plates; Fig. 5, a side view of one of the perforated separators; and Fig. 6, a transverse sectional view of a portion of the plate, taken on line 6 of Fig. 4.

In the art to which this invention relates it is well known that many different kinds of conducting supporting plates and grids have been designed to surround and hold the active material and prevent its falling away from its supporting-plate, as well as to guard against buckling of the plates. It is also well known that in nearly all of these instances the attempt to entirely eliminate the danger of warping and buckling has been unsuccessful and that more or less warping and buckling is still incident to the use of supporting-plates in secondary batteries. My invention therefore is intended principally to obviate these objections and to provide a simple, economical, and efficient secondary battery of very light and large capacity.

In constructing a secondary battery in accordance with my improvements I make a plate A of lead or other suitable metallic material which has been preferably rolled into thin sheets and cut into the desired shape. (Particularly shown in Fig. 4.) This plate, as above stated, is preferably formed of rolled sheet metallic lead, and in order to assist in holding the active material in position I perforate this plate alternately from side to side, as shown at $a$ and $a'$, by the use of a stamp, so that it raises small cylindrical projections, (shown particularly in Fig. 6,) preferring to arrange the perforations in rows alternating from side to side.

I prefer to mechanically apply the active material B to the plate, as shown in Fig. 6. When mechanically applied, this material is spread in a homogeneous paste of lead salts until the plate is filled flush with the raised edges of the perforations, which assists in locking or holding the paste in position. It will be observed that this paste instead of being composed of small pellets has its entire mass arranged in one integral piece or sheet, so that the danger of destruction in a step-by-step process is eliminated and the entire mass made self-supporting. A great advantage derived from the use of a plate constructed in this manner is due to the fact that the supporting grid or plate is buried in the mass of active material, and as a consequence is not subjected to the disintegrating influence of the electrolytic action and still further removed from the surface of the plate, where it is most objectionable.

It is well known in this art that when a secondary battery is in use, and particularly in connection with motor-vehicles, the plate being continually exposed to the washing action of the electrolytic fluid from the motion of the vehicle is rapidly washed away. In order to minimize this danger and further assist in holding the active material in position, I provide an absorbent envelop C, preferably formed of cellulose or what is known in the art as "sulfate-paper." (Shown particularly in Fig. 1.) This cellulose or paper envelop is arranged in thin sheets, so as to practically completely inclose each plate or element. This arrangement of envelop practically stops all of the washing, and as a consequence lengthens life and prolongs the efficiency of the battery. To still further assist in properly insulating the plates and keeping them at equal distances from each other, as is necessary in all batteries of this type, I provide a sheet of wood-pulp D, having a multiplicity of perforations $d$, which is placed against the above-described envelop and between the plates and is of such thickness as to completely fill the space between the opposing elements of the battery and keep the cellulose envelop in contact with the plate. These perforations form little cells for holding liquid as well as to diminish the internal resistance of the cell below what it would be where the wood-pulp is used in imperforate sheets. A further advantage of these cells is that each holds its own complement of liquid, and thus acts to prevent stratification of the electrolyte, which entails more or less serious consequences.

In order to connect the elements economically and efficiently, the elements in each set are provided with lateral projections $A'$, adapted to be bent at right angles to the plate, as shown particularly in Fig. 1. These lateral projections in each set of elements are connected together, so as to provide for the electrical connection below the surface of the electrolytic fluid, which prevents the destructive sulfating above the liquid-line. After the elements are arranged in intermeshing sets, as shown in Fig. 1, they are provided with terminals $A^2$ and $A^3$ and immersed in a cell filled with an electrolyte composed of sulfuric acid and water.

While I have described my invention with more or less minuteness as regards details of construction and arrangement, I do not desire to be limited thereto unduly or any more than is pointed out in the claims. On the contrary, I contemplate all proper changes in form, construction, and operation, the omission of immaterial elements, and the substitution of equivalents as circumstances may suggest or necessity render expedient.

I claim—

1. In a secondary battery, the combination of a supporting plate or grid with its complemental active material, an envelop formed of cellulose or similar material in thin sheets surrounding the plate, and a relatively thicker perforated separator composed of a sheet of wood-pulp fiber arranged so as to fill the space between the elements and hold the cellulose envelop in contact with said plate, substantially as described.

2. In a secondary battery, the combination of a supporting plate or grid with its complemental active material, a flexible porous envelop arranged in a thin sheet and surrounding the plate, and a perforated separator composed of a sheet of porous material arranged to fill the space between the elements and hold the flexible envelop in contact with the plate, substantially as described.

WALTER A. CROWDUS.

Witnesses:
 THOMAS F. SHERIDAN,
 THOMAS B. McGREGOR.